(12) United States Patent
Currier

(10) Patent No.: US 6,821,439 B1
(45) Date of Patent: Nov. 23, 2004

(54) WATER PURIFICATION USING ORGANIC SALTS

(75) Inventor: Robert P. Currier, Santa Fe, NM (US)

(73) Assignee: The Regents of the University of California, Los Alamos, NM (US)

( * ) Notice: Subject to any disclaimer, the term of this patent is extended or adjusted under 35 U.S.C. 154(b) by 151 days.

(21) Appl. No.: 10/186,789

(22) Filed: Jun. 28, 2002

(51) Int. Cl.$^7$ ................................................ C02F 1/54
(52) U.S. Cl. ...................... 210/711; 210/712; 210/729; 210/737
(58) Field of Search ............................. 210/710, 711, 210/712, 729, 737

(56) References Cited

U.S. PATENT DOCUMENTS

| | | | |
|---|---|---|---|
| 2,904,511 A | | 9/1959 | Donath |
| 3,415,747 A | * | 12/1968 | Glew ........................ 210/729 |
| 4,207,351 A | | 6/1980 | Davies ...................... 426/387 |
| 4,678,583 A | | 7/1987 | Willson, III et al. ........ 210/638 |
| 5,553,456 A | | 9/1996 | McCormack .................. 62/59 |
| 6,158,239 A | | 12/2000 | Max et al. ................... 62/532 |
| 6,159,379 A | * | 12/2000 | Means et al. ............... 210/708 |

OTHER PUBLICATIONS

D. L. Fowler, W. V. Loebenstein, D. B. Pall, and Charles A. Kraus, "Some Unusual Hydrates of Quaternary Ammonium Salts," Contribution from the Metcalf Research Laboratory of Brown University, vol. 62, pp. 1140–1142, May 1940.
Richard McMullan and G. A. Jeffrey, "Hydrates of the Tetra n–butyl and Tetra i–amyl Quaternary Ammonium Salts," The Journal of Chemical Physics, vol. 31, No. 5, pp. 1231–1234, Nov. 1959.
Irene S. Terekhova, Vladimir L. Bogatyryov, and Yuri A. Dyadin, "Composition of the Clathrate Polyhydrate of a Carboxyl Cationite in the Tetraisoamylammonium Form," Mendeleev Communications Electronic Version, Issue 1, 1998.

Yuri A. Dyadin and Lyudmila S. Aladko, "Clathrate Hydrates of Long–Chain Tetgrabutylammonium Carboxylates," Mendeleev Communications Electronic Version, 1995.
Richard A. McCormack and Richard K. Andersen, "Clathrate Desalination Plant Preliminary Research Study," Water Treatment Technology Program Report No. 5, Jun. 1995.
Roy Popkin, "*Desalination, Water for the World's Future,*" Frederick A. Praeger, Publishers, pp. 17.
A. Delyannis E.–E. Delyannis, "*Seawater and Desalting,*" Springer–Verlag, Berlin Heidelberg, New York, vol. 1, pp. 169–171, 1980.
Everett D. Howe, "*Fundamentals of Water Desalination,*" Marcel Dekker, Inc, New York, pp. 80,1974.
K. S. Spiegler, "*Salt–Water Purification,*" John Wiley & Sons, Inc., New York—London, pp. 110–111.
K. S. Spiegler, "*Principles of Desalination,*" Academic Press, pp. 339–343, 1966.
Konstantin A. Udachin and John A. Ripmeester, "A Polymer Guest Transforms Clathrate Cages into Channels. The Single–Crystal X–Ray Structure of Tetra–n–butylammonium Polyacrylate Hydrate, $nBU_2O_2$" Angew. Chem. Int. Ed., vol. 38, No. 13/14, pp, 1999.
Haruo Nakayama and Ryoichi Yamada, "The Effect of Simple Anions on the Formation of Poly(tetraisopentylammonium Acrylate) Hydrates," Thermochimica Acta, vol. 250, pp. 97–107, 1995.

(List continued on next page.)

*Primary Examiner*—Robert A. Hopkins
(74) *Attorney, Agent, or Firm*—Samuel L. Borkowsky

(57) ABSTRACT

Water purification using organic salts. Feed water is mixed with at least one organic salt at a temperature sufficiently low to form organic salt hydrate crystals and brine. The crystals are separated from the brine, rinsed, and melted to form an aqueous solution of organic salt. Some of the water is removed from the aqueous organic salt solution. The purified water is collected, and the remaining more concentrated aqueous organic salt solution is reused.

13 Claims, 1 Drawing Sheet

OTHER PUBLICATIONS

Haruo Nakayama and Kei Baba, "Hydrates of Organic Compounds. XVIII, The Formation of Hydrates of Tetraisopentylammonium Salts Having Polyanions," Bull. Chem. Soc. Jpn., vol. 66, No. 12, pp. 3585–3588, 1993.

Haruo Nakayama and Ryoichi Yamada, "Hydrates of Organic Compounds. XVII, The Effects of Cations on the form of Hydrates of Poly(tetraisopentylammonium Acrylate," Bull. Chem. Soc. Jpn., vol. 65, No. 10, pp. 2704–2708, 1992.

Haruo Nakayama, Masashi Yamanobe, and Kei Baba, "Hydrates of Organic Compounds. XVI, Determination of the Melting Points and Hydration Numbers. of the Hydrates of Tetrabutyl(or Tetraaisopentyl)ammonium Alkanesulfonates," Bull. Chem. Soc. Jpn., vol. 64, No. 10, pp. 3023–3028, 1991.

Haruo Nakayama, Kayoko Nakamura, Yukio Haga, and Yoji Sugiura, "Hydrates of Organic Compounds. XV, The Formation of Clatrate–Like Hydrates of Tetraisopentylammonium Alkanoates and Alkanedoioates," Bull. Chem. Soc. Jpn., vol. 64, No. 2, pp. 358–365, 1991.

Haruo Nakayama, Hiromi Kuwata, Norikazu Yamamoto, Yutaka Akagi, and Hiroshi Matsui, "Solubilities and Dissolution States of a Series of Symmetrical Tetraalkylammonium Salts in Water," Bull. Chem. Soc. Jpn., vol. 62, pp. 985–992, 1989.

Haruo Nakayama, Hydrates of Organic Compounds. XIII, The Confirmation of the Formation of Clatrate–Like Hydrates of Tetrabutylammonium and of Tetraisopentylammonium Polyacrylates, Bull. Chem. Soc. Jpn., vol. 60, No. 7, pp. 2319–2326, 1987.

V. L. Bogatryov and A. V. Pirozhkov., "Stabilization of the Clathrate Structure of Polymer Hydrates with Gases," Journal of Structural Chemistry, vol. 36, No. 3, pp. 517–519, 1995.

H. Nakayama, M. Yamanobe, and K. Baba, "The Confirmation of the Formation of Clatrate–Like Hydrates of Poly-(Tetrabutylammonium Ethenesulfonate) and of Poly(Tetraisopentylammonium) Ethenesulfonate)," Journal of Thermal Analysis, vol. 40, pp. 445–451, 1993.

* cited by examiner

US 6,821,439 B1

WATER PURIFICATION USING ORGANIC SALTS

This invention was made with government support under Contract No. W-7405-ENG-36 awarded by the U.S. Department of Energy. The government has certain rights in the invention.

FIELD OF THE INVENTION

The present invention relates generally to water purification and more particularly to water purification using organic additives that include organic salts and salts of organic polymers.

BACKGROUND OF THE INVENTION

A reliable supply of fresh water is necessary for human consumption, for energy conversion technologies, for irrigation, and for other important uses. Many populated areas are in short supply of fresh water and must rely on water purification technologies such as desalination to provide for, or at least add to, their supply of fresh water. Middle Eastern countries, the Canary Islands, and Mauritius, for example, rely on desalination plants to produce fresh water from seawater. Seawater is a complex substance having a high concentration of sodium chloride and a wide variety of other impurities. Desalination removes most of the sodium chloride and other impurities to produce purified water.

A variety of desalination methods have been reported. They include gas-hydrate formation methods and high-pressure, reverse osmosis methods. Gas hydrate formation methods were examined during an intense period of desalination research from about 1960–1980. A gas hydrate formation method might involve pumping an additive gas though a long tube hundreds of feet below the surface of the sea. Under these conditions of high pressure and low temperature, molecules of additive gas combine with water molecules from the seawater to form a solid, crystalline clathrate known as a "gas hydrate". The crystalline gas hydrate includes gas molecules trapped inside cages of tightly bound water molecules. The crystalline gas hydrate is physically separated from the seawater and/or brine (the brine includes the impurities removed from the seawater) and washed to remove any impurities coated on the gas hydrate crystals. The washed crystals are then degassed to produce fresh water. The additive gas may be recovered, recompressed, and recycled if desired.

Current reverse-osmosis desalination methods require high pressures and employ membranes that filter away many of the impurities from "feed water" (i.e. water with undesired impurities to be removed) and reduce the salt levels to 300 ppm in a single pass. While these membranes are very effective, they are also subject to fouling and scaling from impurities in the feed water. Efforts to eliminate fouling by pretreating the feed water with chlorine to kill bacteria and algae, and to eliminate scaling by adjusting the pH of the feed water to minimize precipitation of insoluble calcium salts and silica, have been met with limited success. Membrane fouling and scaling remains a constant problem. Moreover, reverse osmosis processes are very expensive due to high-pressure requirements, typically 70–80 bar.

In 1996, the Desalination and Water Purification Research and Development Program was authorized by Congress. Information relating to this program can be found at the following website: www.usbr.gov/water/content/c_desal.html. The primary goal of the Program is the development of a "cost-effective, technologically efficient, and implementable" means to desalinate water. This program has provided support for the development of new membranes, the application of gas hydrate-assisted desalination, and the design of pumps and vessels, and pilot plant scale testing. While pilot plant scale testing indicated that the energy cost for the production of one cubic meter of fresh water from seawater could be reduced, it remains unlikely that current desalination technology is economically viable in competitive markets. Thus, there remains a need for more efficient water purification methods such as desalination.

Therefore, an object of the present invention is to provide an efficient water purification method.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a water purification method. The method includes contacting feed water with at least one organic salt at a temperature sufficiently low to form brine and organic salt hydrate crystals. The organic salt hydrate crystals are separated from the brine, rinsed with fresh water, and melted to form a solution comprising water and at least one organic salt. Fresh water is then separated from the solution.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE INVENTION

Figure 1:
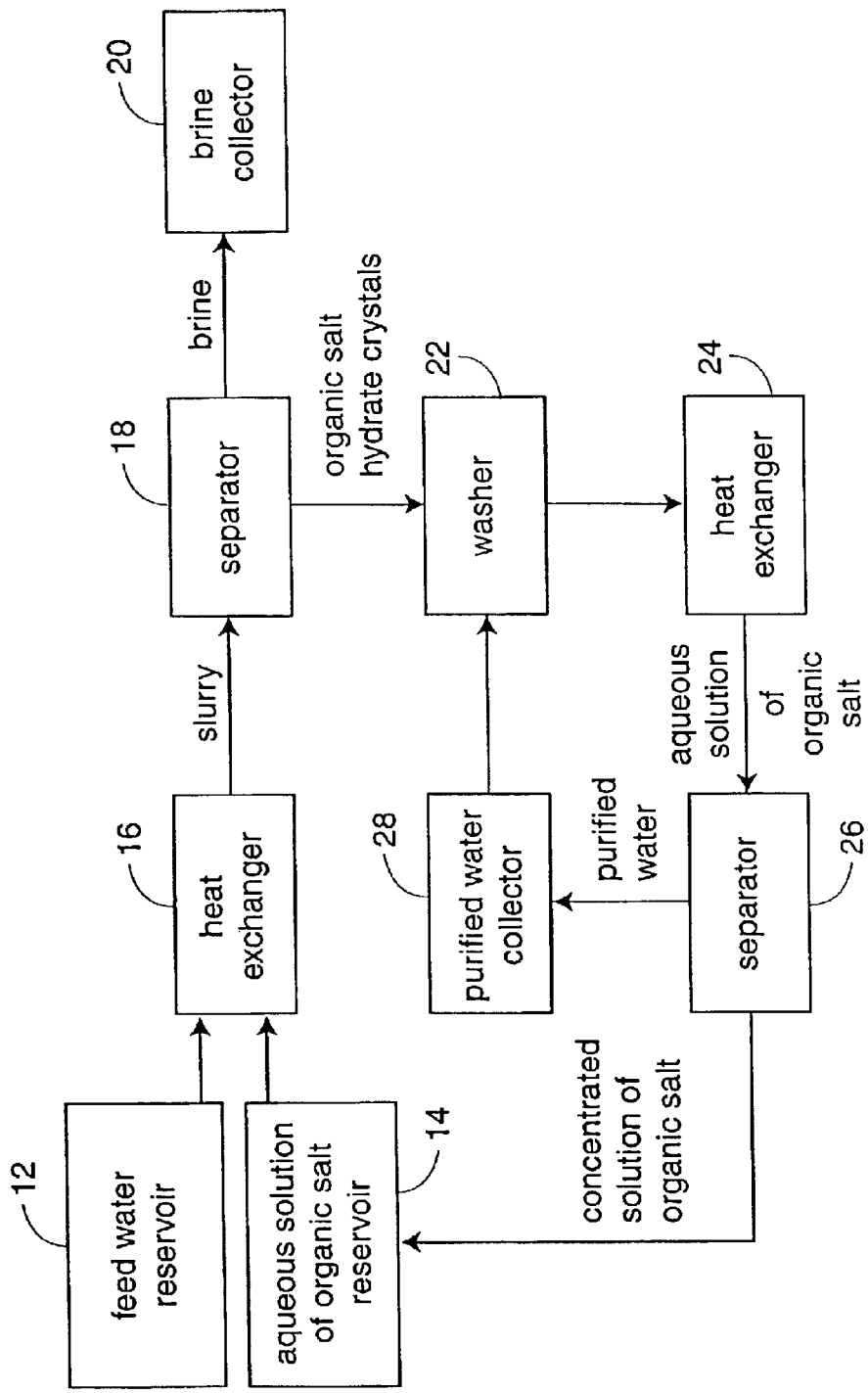
FIG. 1 shows a typical process flow diagram for the invention.

The present invention includes a method for purifying "feed water" (i.e. the water with the undesired impurities) using organic salts. Desalination is a specific example of the water purification method of the invention where the "feed water" is seawater. Other examples of feed water that can be used with the invention include, but are not limited to, terrestrial saline water (from a saline lake or aquifer, for example), effluent water such as waste bath water, waste sink water, waste water from a municipal or industrial plant, and the like. Impurities in feed water may include inorganic impurities such as salts (e.g. sodium chloride and magnesium carbonate) and organic impurities such as soap, detergent, sludge, oil, waste products, microorganisms (e.g. bacteria) and microorganism byproducts, and the like. The method of the invention removes impurities from feed water to produce purified water. The brine (i.e. the portion removed from the feed water that includes the removed impurites) is generally disposed of as waste.

The method of the invention involves adding organic salts to feed water to form solid, crystalline organic salt hydrates. These crystalline organic salt hydrates differ from crystalline gas hydrates in at least one important respect: the number of waters of hydration per molecule is typically greater for the crystalline organic salt hydrate than for the gas hydrate. Many crystalline organic salt hydrates have been reported with over 40 water molecules of hydration and some with over 80 water molecules of hydration organic per molecule of organic salt hydrate (tetraalkylammonium dicarboxylates, for example).

At least some solid, crystalline organic salt hydrates can form at, or near, ambient temperatures and pressures. After they form, they are physically separated from the brine that remains behind using filters, cyclones, and/or other standard separation technology.

As needed, the organic salt crystals are rinsed with water to remove any residual impurities on the surface of the crystals, and melted to produce an aqueous solution of the organic salt. At least some of the water from the solution is removed as purified water.

The remaining aqueous solution, which is now more concentrated in the organic salt, can be recycled. The practice of the invention can be further understood with the accompanying figures. Similar or identical structure is identified using identical callouts.

Turning now to the figures, FIG. 1 shows a typical process flow diagram for the invention. Feed water used with the invention may be pretreated to remove large particulate matter. Feed water from feed water reservoir 12 and an aqueous solution of at least one organic salt from organic salt reservoir 14 flow into heat exchanger 16 wherein they form a mixture. As heat exchanger 16 removes heat from the mixture of feed water and organic salt, organic salt hydrate crystals and brine form. The mixture of brine and crystals is sent to a separator 18, which may include filters, cyclones, or the like, which separates the organic salt hydrate crystals from the brine. The brine, which may include impurities such as suspended solids, sodium chloride, calcium salts, silicates, algae, bacteria, and the like, is sent to brine collector 20 for disposal.

The organic salt hydrate crystals are sent to washer 22 where they are rinsed with water, as needed, to remove any residual brine. The washed organic salt hydrate crystals are then sent to heat exchanger 24, where they are melted to produce an aqueous solution of the organic salt. This solution is sent to separator 26, which separates at least some water from the aqueous solution of organic salt by one or more standard techniques such as filtration, reverse osmosis, or adsorption onto a suitable regenerative adsorbent bed. The water removed from the aqueous solution of organic salt is now purified water and is collected in collector 28. A small portion of this purified water may be diverted from collector 28 to washer 22 for washing the organic salt hydrate crystals. As purified water is produced from separator 26, the resulting aqueous solution of organic salt becomes more concentrated, and is sent back to reservoir 14 for reuse. The organic salt hydrate may form without the need for additional cooling from heat exchanger if the temperature of the feed water is lower than the melting temperature of the crystalline organic salt hydrate formed. Thus, there is an advantage to using cold feed water to minimize the energy expended in cooling the feed water to a temperature sufficiently low to form organic salt hydrate crystals. Heat exchanger 16 may be coupled to heat exchanger 24 to minimize energy costs.

Organic salts that can be used with the invention include ammonium salts, sulfonium salts, and phosphonium salts.

The ammonium salts include those having the chemical formula

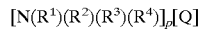

$$[N(R^1)(R^2)(R^3)(R^4)]_p[Q]$$

wherein $R^1$, $R^2$, $R^3$, and $R^4$ are independently selected from alkyl groups having 1–5 carbons, alkenyl groups having 2–5 carbons, alkynyl groups having 2–5 carbons; wherein Q is selected from fluoride, chloride, bromide, iodide, hydroxide, sulfate, nitrate, chromate, tungstate, phosphate, hydrogen phosphate, dihydrogen phosphate, carbonate, hydrogen carbonate, formate, and carboxylates having the formula $(R^5)CO_2^-$ wherein $R^5$ is an alkyl group having 1–12 carbons or an alkenyl group having 1–12 carbons. In above chemical formula, p=1 when Q is fluoride, chloride, bromide, or any of the other singly charged monoanions; p=2 when Q is chromate, formate, or any of the dianions; and p=3 when Q is a triply charged trianion such as phosphate. Anions also include difunctional dianions having the formula

$$[M(CH_2)_nM]^{-2}$$

wherein n is 0–12 when M is $-CO_2^-$ or $-C_6H_4CO_2^-$. The difunctional carboxylates include oxalate, malonate, succinate, adipate, glutarate, and pimelate. Also for the above formula, M is $-SO_3^-$ or $-C_6H_4SO_3^-$ for n=1–12 and preferably for n=2–5.

The sulfonium salts include those having the chemical formula

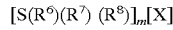

$$[S(R^6)(R^7)(R^8)]_m[X]$$

wherein $R^6$, $R^7$, and $R^8$ are independently selected from alkyl groups having 1–5 carbons, alkenyl groups having 2–5 carbons, alkynyl groups having 2–5 carbons; wherein X is selected from fluoride, chloride, bromide, iodide, hydroxide, sulfate, nitrate, chromate, tungstate, phosphate, hydrogen phosphate, dihydrogen phosphate, carbonate, hydrogen carbonate, formate, and carboxylates having the formula $(R^9)CO_2^-$ wherein $R^9$ is alkyl group having 1–12 carbons or an alkenyl group having 1–12 carbons. In this formula, m=1 when X is fluoride, chloride, bromide, or any of the other singly charged monoanions; m=2 when X is chromate, formate, or any of the dianions; and m=3 when X is a triply charged trianion such as phosphate. Anions also include difunctional dianions having the formula

$$[M(CH_2)_nM]^{-2}$$

wherein n is 0–12 when M is $-CO_2^-$ or $-CCH_4CO_2^-$. The difunctional carboxylates include oxalate, malonate, succinate, adipate, glutarate, and pimelate. Also for the above formula, M is $-SO_3^-$ or $-C_6H_4SO_3^-$ for n=1–12 and preferably for n=2–5.

The organic phosphonium salts include those with the formula

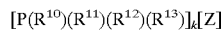

$$[P(R^{10})(R^{11})(R^{12})(R^{13})]_k[Z]$$

wherein $R^{10}$, $R^{11}$, $R^{12}$, and $R^{13}$ are independently selected from alkyl groups having 1–5 carbons, alkenyl groups having 2–5 carbons, alkynyl groups having 2–5 carbons; wherein Z is selected from fluoride, chloride, bromide, iodide, hydroxide, sulfate, nitrate, chromate, tungstate, phosphate, hydrogen phosphate, dihydrogen phosphate, carbonate, hydrogen carbonate, formate, and carboxylates having the formula $(R^{14})CO_2^-$ wherein $R^{14}$ is alkyl group having 1–12 carbons or an alkenyl group having 1–12 carbons. In this formula, k=1 when Z is fluoride, chloride, bromide, or any of the other singly charged monoanions; k=2 when Z is chromate, formate, or any of the dianions; and k=3 when Z is a triply charged trianion such as phosphate. Anions also include difunctional dianions having the formula $$[M(CH_2)_nM]^{-2}$$

wherein n is 0–12 when M is —$CO_2^-$ or —$C_6H_4CO_2^-$. The difunctional carboxylates include oxalate, malonate, succinate, adipate, glutarate, and pimelate. Also for the above formula, M is —$SO_3^-$ or —$C_6H_4SO_3^-$ for n=1–12 and preferably for n=2–5.

Examples of salts that can be used with the invention are listed in Table 1. Also included are the melting temperatures of the crystalline hydrates of these organic salts, and the number of tightly bound water molecules per molecule of organic salt.

TABLE 1

| Organic salt | Melting temperature of crystalline hydrate (° C.) | Number of bound water molecules |
|---|---|---|
| [N(n-$C_4H_9$)$_4$][Br] | 14.5 | 26 |
| [N(n-$C_4H_9$)$_4$][Cl] | 15 | 30 |
| [N(n-$C_4H_9$)$_4$][F] | 24.9 | 34 |
| [N(n-$C_4H_9$)$_4$][$C_2O_4$] | 16.8 | 64 |
| [N(n-$C_4H_9$)$_4$][$HCHO_2$] | 12.5 | 33 |
| [N(n-$C_4H_9$)$_4$][$CH_3CO_2$] | 10–15 | 60 |
| [N(n-$C_4H_9$)$_4$][$CH_3CH_2CO_2$] | 17 | 50 |
| [N(n-$C_4H_9$)$_4$][$C_6H_5CO_2$] | 3.5 | 35 |
| [N(n-$C_4H_9$)$_4$][$HCO_3$] | 17.8 | 33 |
| [N(n-$C_4H_9$)$_4$]$_2$[$HPO_4$] | 17.2 | |
| [N(n-$C_4H_9$)$_4$]$_2$[$CrO_4$] | 13.6 | 68 |
| [N(n-$C_4H_9$)$_4$][$C_6H_5CO_2$] | 3.5 | 35 |
| [N(n-$C_4H_9$)$_4$]$_2$[$WO_4$] | 15.1 | 60 |
| [N(n-$C_4H_9$)$_4$][$SO_4$] | | |
| [N(i-$C_5H_{11}$)$_4$][$HCHO_2$] | 15–20 | 50 |
| [N(i-$C_5H_{11}$)$_4$][Cl] | 29.8 | 38 |
| [N(i-$C_5H_{11}$)$_4$][F] | 31.2 | 40 |
| [N(i-$C_5H_{11}$)$_4$][OH] | | 32 |
| [N(i-$C_5H_{11}$)$_4$][$CrO_4$] | 21.6 | 78 |
| [N(i-$C_5H_{11}$)$_4$][$WO_4$] | 22.4 | 75 |
| [S(n-$C_4H_9$)$_3$][F] | | 23 |

Anions of organic acid polymers can also be used with the invention. These include polyacrylates and polyvinylsulfates, which form solid, crystalline salt hydrates. Structural formulas that show the repeating unit of two example of polyacrylates and two examples of polysulfonates now follow.

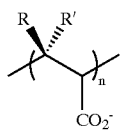
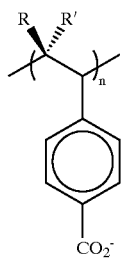
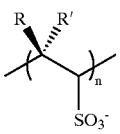
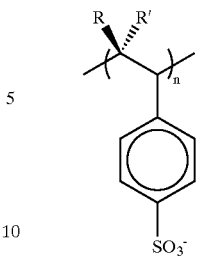

Polyacrylates and polysulfates form solid crystalline hydrates that may have over forty molecules of water for each carboxylate group or sulfate group. The melting points for these crystalline hydrates are typically somewhat lower than the melting points of the corresponding non-polymeric carboxylate and sulfate anions previously described. For the polyacrylate and polysulfates having the structural formula shown above, n is about 1–10,000. R and R' may be the same or different and include hydrogen or alkyl having 1–12 carbons. Anions also include cross-linked polyacrylates and cross-linked polysulfates.

The method may be employed in stages with a series of organic salts. In each stage, a different organic may be employed to produce the corresponding crystalline organic salt hydrate in order to remove specific impurities. At each is stage, the crystalline organic salt hydrate would be separated and then melted and the resulting aqueous solution can be mixed with a different organic salt to form a mixture of crystalline organic salt hydrates that then concentrate other impurities in the brine. The crystals of the latter stages can be separated from the resulting brine and melted to form an aqueous solution with an even lower concentration of impurities.

A "help gas" can be used with the invention to increase the stability of the crystalline organic salt hydrate by filling voids in the crystal structure. The help gas may be added prior to the formation of the solid, crystalline organic salt hydrate and upon melting, would be liberated and could be recovered and reused if desired. Help gases include gases lighter than about 300 Daltons that can participate in crystalline salt hydrate formation. Examples of help gases include, but are not limited to nitrogen, oxygen, argon, air, and carbon dioxide.

It is expected that the energy used to provide purified water according to the invention will be lower than the energy used for current desalination methods, and other water purification methods. This is due, at least in part, to a predicted low energy expenditure expected for forming the organic salt hydrate and for separating the crystalline organic salt hydrate from the remaining brine. There are several reasons why it should require less energy to form an organic salt hydrate than a gas hydrate. Firstly, more cooling is required to form crystalline gas hydrates because they have lower melting points than crystalline organic salt hydrates. Secondly, elevated pressures are required to form crystalline gas hydrates. Thirdly, the recovery and recycle of the gas used in forming crystalline gas hydrates can be expensive. Finally, the cost to separate the organic salt hydrate crystals from the brine using conventional physical separation methods is relatively inexpensive.

Purified water may be separated from the aqueous solution of organic salt by filtration, reverse osmosis, reversible adsorption on a suitable high surface area solid, or by another conventional means. It is currently believed that it is considerably easier and less expensive to separate the purified water from the aqueous solution of organic salt (which is relatively large) than to purify water by separating it directly from feed water (which typically contains species much smaller than the organic salt). The low volatility and relatively large size of these organic salts also makes them ideal for use in a solid hydrate-based separation method and the recovery and recompression of added gas can be avoided. The method of the invention will require less energy than conventional processes, such as high-pressure reverse osmosis and gas hydrate forming processes.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for producing purified water, comprising the steps of:
   (a) contacting feed water with at least one organic salt comprising a tetraalkylammonium salt, a sulfonium salt, or a phosphonium salt at a temperature sufficiently low to form organic salt hydrate crystals and brine;
   (b) separating organic salt hydrate crystals from the brine;
   (c) melting the organic salt hydrate crystals to form an aqueous solution of organic salt; and
   (d) removing at least some of the water from the aqueous solution of organic salt, thereby producing purified water.

2. The method of claim 1, wherein the feed water comprises seawater, terrestrial saline water, effluent water and mixtures thereof that contain inorganic impurities and/or organic impurities.

3. The metros of claim 1, wherein the tetraalkylammonium salt has the formula $$[N(R^1)(R^{23})(R^3)(R^4)]_p[Q]$$

wherein $R^1$, $R^2$, $R^3$, and $R^4$ are independently selected from alkyl groups having 1–5 carbons, alkenyl groups having 2–5 carbons, alkynyl groups having 2–5 carbons;
wherein Q comprises fluoride, chloride, bromide, iodide, hydroxide, sulfate, nitrate, chromate, tungstate, phosphate, hydrogen phosphate, dihydrogen phosphate, carbonate, hydrogen carbonate, a carboxylate having the formula $(R^5)CO_2^{31}$ wherein $R^5$ is selected from hydrogen, an alkyl group having 1–12 carbons, or an alkenyl group having 1–12 carbons, a dianion having the formula

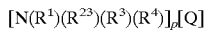
$$[M(CH_2)_nM]^{-2}$$

wherein n is 0–12 and M is $-CO_2^-$ or $-C_6H_4CO_2^-$;
wherein n is 1–12 and M is $-SO_3^-$ or $-C_6H_4SO_3^-$;
wherein p=1 when Q is a monoanion, p=2 when Q is a dianion; and p=3 when Q is a trianion.

4. The method of claim 1, wherein the sulfonium salt has the formula $$[S(R^6)(R^7)(R^8)]_m[X]$$

wherein $R^6$, $R^7$, and $R^8$ are independently selected from allyl groups having 1–5 carbons, alkenyl groups having 2–5 carbons, alkynyl groups having 2–5 carbons; wherein X comprises fluoride, chloride, bromide, iodide, hydroxide, sulfate, nitrate, chromate, tungstate, phosphate, hydrogen phosphate, dihydrogen phosphate, carbonate, hydrogen carbonate, a carboxylate having the formula $(R^5)CO_2^-$ wherein $R^5$ is selected from hydrogen, an alkyl group having 1–12 carbons, or an alkenyl group having 1–12 carbons, a dianion having the formula

$$[M(CH_2)_n]^{-2}$$

wherein n is 0–12 and M is $-CO_2^-$ or $-C_6H_4CO_2^-$;
wherein n is 1–12 and M is $-SO_3^-$ or $-C_6H_4SO_3^-$;
wherein m=1 when X is a monoanion, m=2 when X is a dianion; and m=3 when X is a trianion.

5. The method of claim 1, wherein the phosphonium salt has the formula $$[P(R^{10})(R^{11})(R^{12})(R^{13})]_n[Z]$$

wherein $R^{10}$, $R^{11}$, $R^{12}$, and $R^{13}$ are independently selected from alkyl groups having 1–5 carbons, alkenyl groups having 2–5 carbons, alkynyl groups having 2–5 carbons; wherein Z comprises from fluoride, chloride, bromide, iodide, hydroxide, sulfate, nitrate, chromate, tungstate, phosphate, hydrogen phosphate, dihydrogen phosphate, carbonate, hydrogen carbonate, a carboxylate having the formula $(R^5)CO_2^-$ wherein $R^5$ is selected from hydrogen, an alkyl group having 1–12 carbons, or an alkenyl group having 1–12 carbons, a dianion having the formula

$$[M(CH_2)_aM]^2$$

wherein n is 0–12 and M is $-CO_2^-$ or $-C_6H_4CO_2^-$;
wherein n is 1–12 and M is $-SO_3^-$ or $-C_5H_4SO_5^-$;
wherein k=1 when Z is a monoanion, k=2 when Z is a dianion; and k=3 when Z is a trianion.

6. The method of claim 3, wherein anion Q is a polyacrylate comprising the structural formula

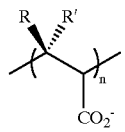

wherein n is about 1–10,000; wherein R and R' may be the same or different and are selected from the group consisting of hydrogen or alkyl having 1–12 carbons;
or wherein anion Q is a polyacrylate comprising the structural formula

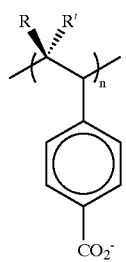

wherein n is about 1–10,000; wherein R and R' may be the same or different and are selected from the group consisting of hydrogen or alkyl having 1–12 carbons.

7. The method of claim 4, wherein anion X is a polyacrylate comprising the structural formula

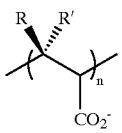

wherein n is about 1–10,000; wherein R and R' may be the same or different and are selected from the group consisting of hydrogen or alkyl having 1–12 carbons;
or wherein anion X is a polyacrylate comprising the structural formula

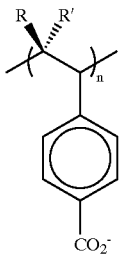

wherein n is about 1–10,000; wherein R and R' may be the same or different and are selected from the group consisting of hydrogen or alkyl having 1–12 carbons.

8. The method of claim 5, wherein anion Z is a polyacrylate comprising the structural formula

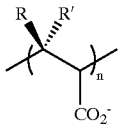

wherein n is about 1–10.000; wherein R and R' may be the same or different and are selected from the group consisting of hydrogen or alkyl having 1–12 carbons;
or wherein Z is a polyacrylate comprising the structural formula

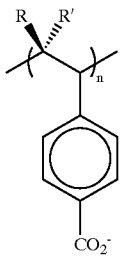

wherein n is about 1–10,000: wherein R and R' may be the same or different and are selected from the group consisting of hydrogen or alkyl having 1–12 carbons.

9. The method of claim 3, wherein anion Q is a polyvinylsulfate comprising the structural formula

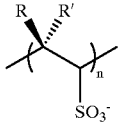

wherein n is about 1–10,000; wherein R and R' may be the same or different and are selected from the group of hydrogen or alkyl having 1–12 carbons:

or wherein anion Q is a polyvinylsulfate comprising the structural formula

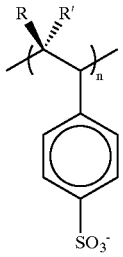

wherein n is about 1–10,000; wherein R and R' may be the same or different and are selected from the group consisting of hydrogen or alkyl having 1–12 carbons.

10. The method of claim 4, wherein anion X is a polyvinylsulfate comprising the structural formula

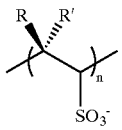

wherein n is about 1–10,000: wherein R and R' may be the same or different and are selected from the group of hydrogen or alkyl having 1–12 carbons, or wherein anion X is a polyvinylsulfate comprising the structural formula

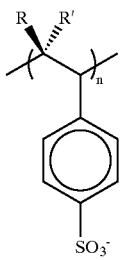

wherein n is about 1–10,000; wherein R and R' may be the same or different and are selected from the group consisting of hydrogen or alkyl having 1–12 carbons.

11. The method of claim 5, wherein anion Z is a polyvinylsulfate comprising the structural formula

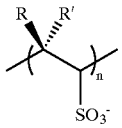

wherein n is about 1–10.000; wherein R and R' may be the same or different and are selected from the group of hydrogen or alkyl having 1–12 carbons;

or wherein anion Z is a polyvinylsulfate comprising the structural formula

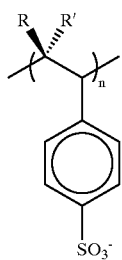

wherein n is about 1–10,000; wherein R and R' may be the same or different and are selected from the group consisting of hydrogen or alkyl having 1–12 carbons.

12. The method of claim 1, further comprising the step of introducing a gas into the feed water to stabilize organic salt hydrate crystals by occupying voids in the crystal structure.

13. The method of claim 12, wherein the gas comprises air, nitrogen, oxygen, argon, carbon dioxide, or mixtures thereof.

* * * * *